United States Patent
Keller et al.

(10) Patent No.: US 12,125,361 B2
(45) Date of Patent: Oct. 22, 2024

(54) SYSTEM AND METHOD FOR MEASURING THE FILL LEVEL OF A TRASH CAN USING A SENSOR

(71) Applicant: 7-Eleven, Inc., Irving, TX (US)

(72) Inventors: John Robert Keller, Plano, TX (US); Matthew O'Daniel Redmond, Denton, TX (US); Shahmeer Ali Mirza, Celina, TX (US)

(73) Assignee: 7-ELEVEN, INC., Irving, TX (US)

( * ) Notice: Subject to any disclaimer, the term of this patent is extended or adjusted under 35 U.S.C. 154(b) by 448 days.

(21) Appl. No.: 17/455,697

(22) Filed: Nov. 19, 2021

(65) Prior Publication Data

US 2023/0162588 A1    May 25, 2023

(51) Int. Cl.
*B65F 1/14*    (2006.01)
*G06Q 10/30*    (2023.01)
*G08B 21/18*    (2006.01)

(52) U.S. Cl.
CPC .............. *G08B 21/182* (2013.01); *B65F 1/14* (2013.01); *B65F 1/1405* (2013.01); *G06Q 10/30* (2013.01); *B65F 2210/128* (2013.01); *B65F 2210/1443* (2013.01); *B65F 2210/168* (2013.01)

(58) Field of Classification Search
CPC ........ G08B 21/182; B65F 1/14; B65F 1/1405; B65F 2210/128; B65F 2210/1443; B65F 2210/168; G06Q 10/30; B30B 15/00
USPC ........ 73/1.73, 1.49, 290 R, 291, 293, 290 B, 73/865.8, 865.9, 432.1; 220/908–910; 206/305; 702/33, 55, 127, 150, 155, 158, 702/159, 166; 340/501, 517, 540, 612, 340/616, 617, 686.1; 100/99
See application file for complete search history.

(56) References Cited

U.S. PATENT DOCUMENTS 11,573,539 B1 *  2/2023  Chakraborty ...... G05B 13/0265

FOREIGN PATENT DOCUMENTS

| CA | 2806876 A1 * | 2/2012 | ............ B65D 55/00 |
| CH | 713866 A2 * | 12/2018 | |
| CN | 105564870 A * | 5/2016 | |
| CN | 205573081 U * | 9/2016 | |
| KR | 101954400 B1 * | 3/2019 | |
| WO | WO-2014066429 A1 * | 5/2014 | ......... G06Q 30/0241 |

* cited by examiner

*Primary Examiner* — Robert R Raevis
(74) *Attorney, Agent, or Firm* — Baker Botts L.L.P.

(57) ABSTRACT

A system for measuring a fill level of a trash can comprises a processor operable to receive a distance measurement from a network, wherein a sensor communicatively coupled to the processor through the network is operable to determine the distance measurement. The processor is operable to calculate a percentage of waste in the trash can based on the received distance measurement and a difference between a first setpoint and a second setpoint. The processor is operable to determine a threshold for a first period of time based on entity information. The processor is operable to compare the percentage of waste in the trash can to the threshold for the first period of time and to send an alert for display on a user device when the percentage of waste is greater than the threshold for the first period of time.

20 Claims, 4 Drawing Sheets

SYSTEM AND METHOD FOR MEASURING THE FILL LEVEL OF A TRASH CAN USING A SENSOR

TECHNICAL FIELD

The present disclosure relates generally to sensors. More particularly, the present disclosure relates to a system and method for measuring the fill level of a trash can using a sensor.

BACKGROUND

Trash cans are used by most businesses to collect waste or trash from customers throughout the day. A given business, such as a convenience store, may be busier during the morning than in the afternoon. When the business is busy, there is an increased volume of foot traffic entering and exiting the business. There can be a subsequent increased risk of a trash can overflowing with waste based on the increased volume of foot traffic. Depending on how busy the business is during a period of time, it may be difficult to monitor a fill level of the waste or trash present in the trash can.

SUMMARY

The disclosed system provides several practical applications and technical advantages that overcome the previously discussed problems. This disclosure contemplates monitoring a trash can and creating an alert for display on a user device based on a fill level exceeding a determined threshold that is based on stored entity information. In an example, users may throw away waste (i.e., receipts, candy wrappers, beverage containers, etc.) into a trash can while interacting with an entity (i.e., buying an item). In this example, the entity may be a store offering goods for the users. Over time, the fill level of waste in the trash can will increase. To prevent the waste from overflowing and spilling out from the top of the trash can, the trash can may be periodically emptied.

The fill level may increase at a faster or slower rate depending on a time of day. For example, there may be more users present in the morning than in the evening. The disclosed system may identify that there is a greater frequency of waste being thrown away into the trash can during the morning because there are more users present in the morning. The disclosed system may further notify and prompt an employee associated with the entity that the trash can needs to be emptied when the fill level has gotten too high. The condition for notifying the employee may change depending on the time of day. For example, the disclosed system may notify the employee to empty the trash can at a lower fill level during the morning and at a higher fill level during the evening. This is advantageous to mitigate instances where the waste is likely to overflow and spill out from the top of the trash can, such as during the morning when the fill level is increasing at a faster rate. Further, the employee may be able to take advantage of a different period of time, such as during the evening, to perform other operations throughout the store (i.e., stocking shelves, cleaning, etc.) because of the lower frequency of waste being thrown away into the trash can. A practical application is provided herein for efficient maintenance of the trash can. The disclosed system further provides sufficient advanced notice to mitigate the rise in fill level of the trash can.

In an embodiment, a system for measuring a fill level of a trash can comprises a sensor disposed above the trash can, wherein the sensor comprises a laser diode, a photodetector, and a first processor. The laser diode is operable to produce a laser beam pulse that travels towards a bottom end of the trash can, wherein the laser beam pulse is reflected back to the sensor. The photodetector is operable to receive the reflected laser beam pulse. The first processor is communicatively coupled to the laser diode and to the photodetector and configured to determine a distance measurement based on a difference in time between production of the laser beam pulse and reception of the reflected laser beam pulse and to transmit the distance measurement across a network. The system further comprises a computer system communicatively coupled to the sensor, wherein the computer system comprises a memory operable to store entity information comprising of a number of transactions associated with a plurality of users present within an entity based on periods of time. The memory is further operable to store a first setpoint and a second setpoint for determining a threshold. The computer system further comprises a second processor, operably coupled to the memory, configured to receive the distance measurement from the network and to calculate a percentage of waste in the trash can based on the received distance measurement and a difference between the first setpoint and the second setpoint. The second processor is further configured to determine the threshold for a first period of time based on the entity information stored in the memory and to compare the percentage of waste in the trash can to the threshold for the first period of time. The second processor is further configured to send an alert for display on a user device when the percentage of waste is greater than the threshold for the first period of time.

This disclosure further contemplates monitoring a fill level of waste within a trash can disposed inside a trash compactor. The trash compactor may be actuated to reduce the fill level of waste one or more times, based on distance measurements provided by a sensor, before a user empties the waste from the trash can.

For example, users may throw away waste (i.e., receipts, candy wrappers, beverage containers, etc.) into a trash can while interacting with an entity (i.e., buying gasoline to fill up a vehicle). In this example, the trash can may be disposed within a trash compactor that is outside near a gas pump. Over time, the fill level of waste in the trash can will increase. To prevent the waste from overflowing and spilling out from the top of the trash can, the trash can may be periodically emptied.

An employee associated with the entity may be too busy performing other tasks to effectively monitor the fill level of the trash can. As the trash can is located within a trash compactor, the trash compactor may be able to reduce the fill level of waste present within the trash can one or more times before requiring the employee to empty the trash can. The disclosed system may be able to actuate the trash compactor to reduce the fill level when the fill level has gotten too high. The disclosed system may further notify and prompt the employee that the trash can needs to be emptied when the fill level has gotten too high and the trash compactor is no longer able to compress the waste down to reduce the fill level.

In an embodiment, a system for measuring a fill level of a trash can comprises a sensor disposed within a trash compactor and above the trash can. The sensor is configured to determine a distance measurement based on a difference in time between production of a laser beam pulse and reception of a reflected laser beam pulse and to transmit the distance measurement across a network. The system further comprises a computer system communicatively coupled to the sensor. The computer system comprises a memory operable to store a first setpoint and a second setpoint for determining a threshold and a first processor operably coupled to the memory. The first processor is configured to receive the distance measurement from the network and to calculate a percentage of waste in the trash can based on the received distance measurement and a difference between the first setpoint and the second setpoint. The first processor is further configured to compare the percentage of waste in the trash can to a threshold for a period of time and to instruct the trash compactor to reduce the fill level of waste by actuating a ram to extend downwards into the trash can to compress the waste in response a determination that the percentage of waste in the trash can is greater than the threshold for the period of time. The first processor is further configured to send an alert for display on a user device when the percentage of waste is greater than the threshold for the period of time and in response to a determination that the fill level was not reduced below the threshold by actuating the trash compactor.

The disclosed embodiments provide several practical applications and technical advantages, which include at least: 1) technology that utilizes a sensor to measure a distance from the sensor to waste disposed in the trash can corresponding to a fill level of the trash can; 2) technology that determines a threshold value to trigger an alert based on historical foot traffic for a given entity; and 3) technology that automatically provides alerts for display on a user device when the fill level exceeds the determined threshold during a period of time.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

This disclosure provides solutions to the aforementioned and other problems of previous technology through an automatic alerting process for measuring a fill level of a trash can using a sensor.

Example System for Measuring a Fill Level of a Trash Can Using a Sensor

Figure 1A:
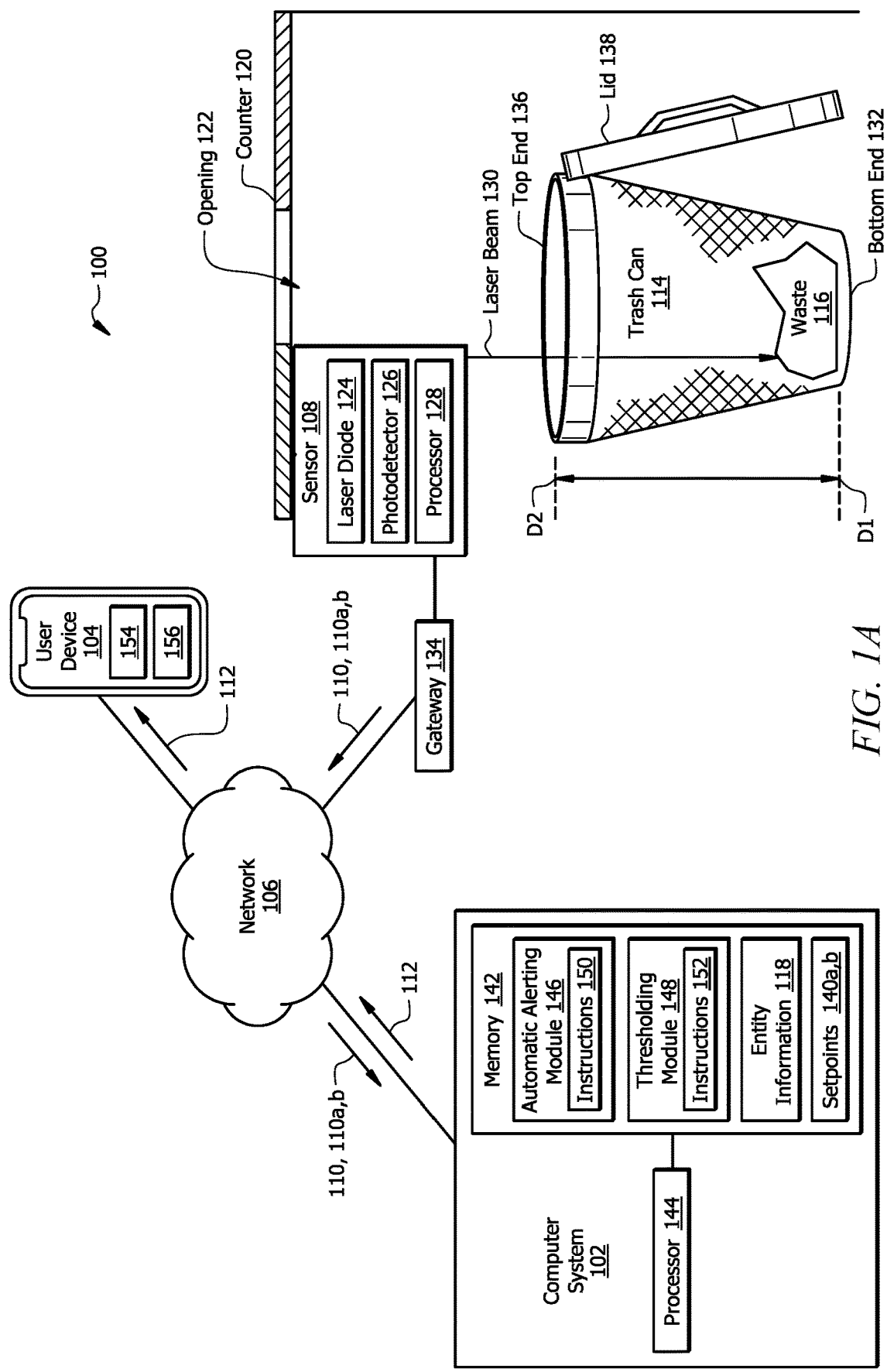
FIG. 1A is a schematic diagram of an example automatic alerting system used in conjunction with a trash can.

FIG. 1A illustrates a schematic diagram of an example automatic alerting system 100. The automatic alerting system 100 may be implemented to monitor a fill level of waste within a trash can. For example, users may throw away waste (i.e., receipts, candy wrappers, beverage containers, etc.) into the trash can while interacting with an entity (i.e., buying an item). In this example, the entity may be a store offering goods for the users. Over time, the fill level of waste in the trash can will increase. To prevent the waste from overflowing and spilling out from the top of the trash can, the trash can may be periodically emptied.

Someone associated with the entity, such as an employee, may be too busy performing other tasks to effectively monitor the fill level of the trash can. Further, the fill level may increase at a faster or slower rate depending on the time of day. For example, there may be more users present in the morning than in the evening. The automatic alerting system 100 may identify that there is a greater frequency of waste being thrown away into the trash can during the morning because there are more users present in the morning. The automatic alerting system 100 may further notify and prompt the employee that the trash can needs to be emptied when the fill level has gotten too high. The condition for notifying the employee may change depending on the time of day. For example, the automatic alerting system 100 may notify the employee to empty the trash can at a lower fill level during the morning and at a higher fill level during the evening. This is advantageous to mitigate instances where the waste is likely to overflow and spill out from the top of the trash can, such as during the morning when the fill level is increasing at a faster rate. Further, the employee may be able to take advantage of a different period of time, such as during the evening, to perform other operations throughout the store (i.e., stocking shelves, cleaning, etc.) because of the lower frequency of waste being thrown away into the trash can.

As illustrated in FIG. 1A, the automatic alerting system 100 includes a computer system 102, a user device 104, a network 106, and one or more sensors 108. Computer system 102 is communicatively coupled to user device 104 and the one or more sensors 108 via the network 106 using any appropriate wired or wireless telecommunication technology. Computer system 102 receives data in the form of distance measurements 110 that are generated by sensor 108 and in turn provides an alert 112 for display on the user device 104 based on comparing a calculation derived from the distance measurement 110 to a threshold. In general, the computer system 102 may perform an alerting process based on the received distance measurement 110 from sensor 108. In particular embodiments, this process uses the sensor 108 to determine a distance to a trash can 114 for the computer system 102 to calculate a percentage of waste 116 present within the trash can 114. The percentage of waste 116 may be compared to a determined threshold value, and the alert 112 may be transmitted to the user device 104 when the percentage of waste 116 is greater than the threshold value. In further embodiments, the threshold value may be determined based on entity information 118 stored in the computer system 102 comprising of a number of transactions associated with a plurality of users present within a given entity based on periods of time.

For example, the sensor 108 may be disposed in proximity to the trash can 114. In a particular embodiment, the sensor 108 is disposed or mounted underneath a counter 120 near an opening 122 in the counter 120, wherein the trash can 114 is housed within the counter 120 and waste 116 may be deposited therein through the opening 122.

Sensor 108 is any appropriate device for sensing or measuring the physical distance to an object. For example, sensor 108 may be a time of flight (ToF) sensor that utilizes a laser to produce a beam of infrared light that is bounced off an object and returned to the sensor 108 in order to measure distance to the object. Sensor 108 may include a laser diode 124, a photodetector 126, and a sensor processor 128. In a particular embodiment, the laser diode 124 may produce a laser beam 130 that travels towards the bottom end 132 of the trash can 114, wherein the laser beam 130 is reflected off of the waste 116 to travel back to the sensor 108. The laser diode 124 may produce pulses of laser beams 130 at a pre-determined frequency. The photodetector 126 may be any appropriate device operable to receive each reflected laser beam 130. In one or more embodiments, the sensor processor 128 may be communicatively coupled to the laser diode 124 and to the photodetector 126. The sensor processor 128 may determine a distance measurement 110 based on a difference in time between production of the laser beam 130 by the laser diode 124 and reception of the reflected laser beam 130 by the photodetector 126. The sensor processor 128 may further transmit each distance measurement 110 across the network 106.

In general, sensor 108 provides the distance measurement 110 to computer system 102. Distance measurement 110 may comprise any appropriate distance value (e.g., inches or millimeters). In some embodiments, distance measurement 110 is provided automatically by sensor 108 at periodic intervals (e.g., every five minutes). In other embodiments, distance measurement 110 is provided by sensor 108 when requested by computer system 102.

In some embodiments, sensor 108 may operate as an Internet-of-Things (IoT) sensor. In general, IoT describes a network of physical objects (or "things") that are embedded with sensors, software, and other technologies for the purpose of connecting and exchanging data with other devices and systems over the internet. In embodiments where sensor 108 is an IoT sensor, automatic alerting system 100 may include a gateway 134 for communicating with sensor 108. Gateway 134 may be any appropriate IoT gateway, computer system, or electronic device that is capable of wirelessly communicating with sensor 108 using any appropriate IoT communications protocol. Without limitations, the IoT communications protocol may include message queuing telemetry transport (MQTT), constrained application protocol (CoAP), advanced message queuing protocol (AMQP), data-distribution service (DDS), Zigbee, Z-Wave, lightweight machine-to-machine (LwM2M), or any combinations thereof. For example, sensor 108 may wirelessly transmit distance measurement 110 to gateway 134, and gateway 134 may in turn send distance measurement 110 to computer system 102 via network 106. In other embodiments, sensor 108 may not be an IoT sensor. In embodiments where sensor 108 is not operable as an IoT sensor, sensor 108 may transmit distance measurement 110 directly to computer system 102 via network 106 (i.e., without utilizing gateway 134).

The computer system 102 may calibrate the sensor 108 to provide measurements relative to the trash can 114 by instructing the sensor 108 to perform a first distance measurement 110a to determine a distance D1 from a bottom end 132 of the trash can 114 to the sensor 108 when the trash can 114 is empty (i.e., when there is no waste 116) and to perform a second distance measurement 110b to determine a distance D2 from a top end 136 of the trash can 114 to the sensor 108. For example, a lid 138 may be disposed at the top end 136 of the trash can 114 to serve as a reference point associated with the top end 136 for detection by the sensor 108. The sensor 108 may transmit the first distance measurement 110a and the second distance measurement 110b to the computer system 102 for storage as setpoints (i.e., a first setpoint 140a and a second setpoint 140b). These setpoints represent the distance measurements associated with an empty trash can and a full trash can. As will be explained in greater detail below, these setpoints will be used to determine the percentage of waste that resides within the trash can (e.g., waste fills 35% of the trash can, or waste fills 90% of the trash can, etc.)

During operation, the sensor 108 may determine a plurality of distance measurements 110 from the location of the waste 116 to the sensor 108 (the "fill level" for the trash can 114), wherein the computer system 102 may receive the plurality of distance measurements 110 transmitted over the network 106. The computer system 102 may calculate a percentage of waste 116 present within the trash can 114 for each one of the plurality of distance measurements 110. Each received distance measurement 110 may be compared to a difference between a first setpoint 140a and a second setpoint 140b, wherein the first setpoint 140a corresponds to the first distance measurement 110a (e.g., empty trash can) and the second setpoint 140b (e.g., full trash can) corresponds to the second distance measurement 110b determined during calibration. The computer system 102 may then compare the calculated percentage of waste 116 against a threshold for a given period of time.

The computer system 102 may dynamically determine the threshold based on the stored entity information 118. For example, the computer system 102 may determine the threshold for different periods of time throughout the day. In this example, a given entity may be busier (i.e., interact with more customers) during the morning than in the evening. When the entity is busy, more waste 116 may be deposited into the trash can 114. The stored entity information 118 may represent when the given entity is busy based on "foot traffic," or the number of customers that enter the given entity, during that period of time. The computer system 102 may designate a lower value for the threshold during the morning because the given entity is busier in the morning. By setting the threshold to a lower value, someone associated with the entity (i.e., an employee) may prevent the trash can 114 from overflowing. When the entity is not busy, such as in the evening, the computer system 102 may designate a higher value for the threshold. Due to the lower volume of foot traffic in the evening, the trash can 114 may fill up at a slower rate. The entity may be able to effectively monitor when the trash can 114 needs emptying while performing other operations (i.e., cleaning, stocking shelves, managing customers, etc.).

In certain examples, the determined threshold may be static. For example, the computer system 102 may designate the threshold to be 75% for each period of time. In the above example where the entity is busy during the morning and not busy during the evening, the determined threshold may remain set as 75% throughout the morning and the evening.

The stored entity information 118 may comprise the historical foot traffic for a given entity (i.e., a number of transactions associated with a plurality of users present within the given entity) over multiple periods of time. For example, the entity information 118 may comprise data associated with a first entity operating at a first location over a plurality of time periods (i.e., every hour, four hours, six hours, etc.). In this particular example, the entity information 118 may indicate that the first entity processes a higher volume of transactions at a first time period than at a second time period. For example, the first entity may process 100 transactions during the first time period and 5 transactions during the second time period. The computer system 102 may identify a high or low volume of transactions within the period of time based on an arbitrary reference value. For example, the computer system 102 may determine that there is a high volume of transactions within the time period if the number of transactions is greater than 60 and that there is a low volume of transactions within the time period if the number of transactions is lower than 30. A higher volume of transactions may be associated with a faster rate at which waste 116 is deposited into the trash can 114 over a given period of time. Based, at least in part, on the higher volume of transactions, the frequency at which the trash can 114 requires emptying of waste 116 increases.

In embodiments wherein there is a higher volume of transactions, a lower threshold (i.e., 70%) may be designated for use by the computer system 102 for the percentage of waste 116 in the trash can 114, wherein a value greater than the threshold would trigger the alert 112 for a user to empty the trash can 114 before an instance wherein waste 116 overflows from the trash can 114. In embodiments wherein there is a lower volume of transactions, a higher threshold (i.e., 90%) may be designated for use by the computer system 102. In this example, as the automatic alerting system 100 transitions from operating within the first time period to the second time period, the computer system 102 may compare the calculated percentages of waste 116 to the higher threshold instead of the lower threshold.

In certain embodiments, the entity information 118 may comprise a compilation of historical foot traffic for a plurality of entities based on periods of time. For example, a first entity may be newly constructed and may have been operating for a few days. There may not be entity information 118 associated with the first entity available to be used to determine the threshold for a period of time. In this example, there may be a second entity and a third entity located within the same geographical area as the first entity that have each been operating for years. The computer system 102 may utilize the historical foot traffic of the second entity and the third entity to determine the threshold for use in the first entity. The computer system 102 may determine the threshold based on average values for the second entity and the third entity. Similar to the other examples, the computer system 102 may iteratively receive distance measurements 110 from the sensor 108, calculate the percentage of waste 116 in the trash can 114, and compare the calculated percentage of waste 116 to the determined threshold until the threshold has been exceeded. The computer system 102 may then transmit the alert 112 to the user device 104, wherein a user may then empty the waste 116 from the trash can 114.

Computer system 102 may be any appropriate computing system in any suitable physical form. As example and not by way of limitation, computer system 102 may be an embedded computer system, a system-on-chip (SOC), a single-board computer system (SBC) (such as, for example, a computer-on-module (COM) or system-on-module (SOM)), a desktop computer system, a laptop or notebook computer system, a mainframe, a mesh of computer systems, a mobile telephone, a personal digital assistant (PDA), a server, a tablet computer system, an augmented/virtual reality device, or a combination of two or more of these. Where appropriate, computer system 102 may include one or more computer systems 102; be unitary or distributed; span multiple locations; span multiple machines; span multiple data centers; or reside in a cloud, which may include one or more cloud components in one or more networks. Where appropriate, one or more computer systems 102 may perform without substantial spatial or temporal limitation one or more steps of one or more methods described or illustrated herein. As an example and not by way of limitation, one or more computer systems 102 may perform in real time or in batch mode one or more steps of one or more methods described or illustrated herein. One or more computer systems 102 may perform at different times or at different locations one or more steps of one or more methods described or illustrated herein, where appropriate. The computer system 102 may include a memory 142 operable to store information and/or provide access to application(s), wherein the memory 142 includes software instructions that, when executed by a processor 144, cause the computer system 102 to perform one or more functions described below. Computer system 102 may be physically located within the same physical building in which sensor 108 is located, or physically located at a location remote from the physical building in which sensor 108 is located. For example, in certain embodiments, computer system 102 may be located in one or more remote servers (e.g., in the cloud). Details of the operations of the computer system 102 are described in conjunction with FIG. 2.

Processor 144 is any electronic circuitry, including, but not limited to a microprocessor, an application specific integrated circuits (ASIC), an application specific instruction set processor (ASIP), and/or a state machine, that communicatively couples to memory 142 and controls the operation of computer system 102. Processor 144 may be 8-bit, 16-bit, 32-bit, 64-bit or of any other suitable architecture. Processor 144 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 144 may include other hardware that operates software to control and process information. Processor 144 executes software stored in memory to perform any of the functions described herein. Processor 144 controls the operation and administration of computer system 102 by processing information received from sensor 108, network 106, user device 104, and memory 142. Processor 144 may be a programmable logic device, a microcontroller, a microprocessor, any suitable processing device, or any suitable combination of the preceding. Processor 144 is not limited to a single processing device and may encompass multiple processing devices.

Memory 142 may store, either permanently or temporarily, data such as distance measurements 110, entity information 118, setpoints, user preferences, business rules, operational software such as automatic alerting module 146 and thresholding module 148, or other information for processor 144. Memory 142 may include any one or a combination of volatile or non-volatile local or remote devices suitable for storing information. For example, memory 142 may include random access memory (RAM), read only memory (ROM), magnetic storage devices, optical storage devices, or any other suitable information storage device or a combination of these devices.

Automatic alerting module 146 represents any suitable set of instructions, logic, or code embodied in a computer-readable storage medium. For example, automatic alerting module 146 may be embodied in memory 142, a disk, a CD, or a flash drive. In particular embodiments, automatic alerting module 146 may include alerting instructions 150 (e.g., a software application) executable by processor 144 to perform one or more of the functions described herein. In general, automatic alerting module 146 sends alert 112 for display on user device 104 via network 106. As described in more detail below, alert 112 is generated by automatic alerting module 146 based on the distance measurements 110 from sensor 108.

Thresholding module 148 represents any suitable set of instructions, logic, or code embodied in a computer-readable storage medium. For example, thresholding module 148 may be embodied in memory 142, a disk, a CD, or a flash drive. In particular embodiments, thresholding module 148 may include thresholding instructions 152 (e.g., a software application) executable by processor 144 to perform one or more of the functions described herein. In general, thresholding module 148 determines a threshold for a period of time. As described in more detail below, the determined threshold is compared to the calculated percentages of waste 116 present within the trash can 114 based on the received distance measurements 110 from the sensor 108, wherein the threshold may be dynamically or statically set. The threshold may be determined based on the stored entity information 118 for a period of time, wherein multiple thresholds may be determined over a plurality of periods of time, or the threshold may be statically set across the plurality of periods of time.

User device 104 is any appropriate device for communicating with components of computer system 102 over network 106. For example, user device 104 may be a handheld computing device such as a smartphone, wearable computer glasses, a smartwatch, a tablet computer, a laptop computer, and the like. User device 104 may include an electronic display, a processor such as processor 144, and memory such as memory 142. The electronic display of user device 104 may display the alert 112 that is provided by computer system 102. For example, in certain embodiments, user device 104 may generate a pop-up message that includes the alert 112, and automatically display the pop-up message on a screen of user device 104. In some embodiments, user device 104 may generate a sound and/or vibration in response to receiving alert 112. In certain embodiments, user device 104 may display a graphical user interface (GUI) on a screen of user device 104 within which the alert 112 may be displayed. In further examples, user device 104 may receive alert 112 through an email and/or text message. The alert 112 may indicate that the percentage of waste 116 has surpassed the threshold and may signal for an event to occur, such as emptying the waste 116 present within the trash can 114 in order to prevent waste 116 from overflowing out of the trash can 114. After receiving the alert 112, a user associated with the user device 104 may remove the trash can 114 from the counter 120, empty or remove the waste 116 present in the trash can 114, and re-position the trash can 114 within the counter 120.

In certain embodiments, user device 104 may receive measurements made by the sensor 108 and use the measurements to monitor a fill level of waste 116 within the trash can 114. In these embodiments, the sensor 108 may directly communicate with the user device 104 instead of with the computer device 102. For example, in such embodiments, a memory 154 of user device 104 may include instructions (e.g., instructions 150 and/or 152 described in detail below) that, when executed by a processor 156 of user device 104, enable the device to determine, based on the received measurements, when to empty the trash can 114. For example, instructions stored in memory 154 may indicate that the percentage of waste 116 in the trash can 114 has exceeded a determined threshold for a period of time. In response to this event, user device 104 may automatically generate and display an alert for a user associated with user device 104.

Network 106 allows communication between and amongst the various components of system 100. For example, computer system 102, user device 104, and sensor 108 may communicate via network 106. This disclosure contemplates network 106 being any suitable network operable to facilitate communication between the components of system 100. Network 106 may include any interconnecting system capable of transmitting audio, video, signals, data, messages, or any combination of the preceding. Network 106 may include all or a portion of a local area network (LAN), a wide area network (WAN), an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, etc.), a Long Term Evolution (LTE) network, a Universal Mobile Telecommunications System (UMTS) network, a peer-to-peer (P2P) network, a Bluetooth network, a Near Field Communication (NFC) network, a Zigbee network, and/or any other suitable network, operable to facilitate communication between the components.

Example System for Measuring a Fill Level of a Trash Compactor Using a Sensor

Figure 1B:
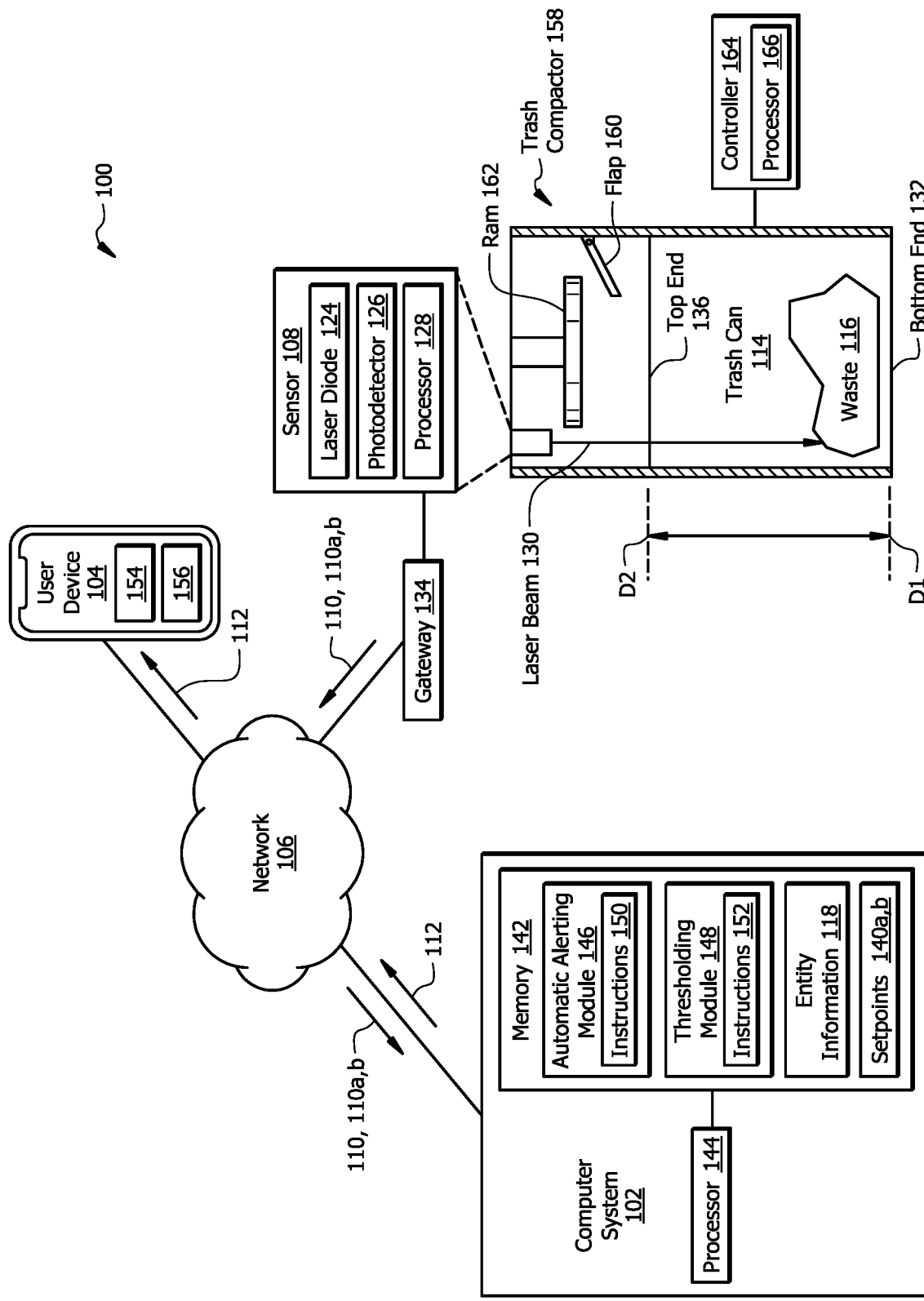
FIG. 1B is a schematic diagram of an example automatic alerting system used in conjunction with a trash compactor.

FIG. 1B illustrates a schematic diagram of another example automatic alerting system 100 for operation with a trash compactor 158. The automatic alerting system 100 may be implemented to monitor a fill level of waste within the trash can 114 disposed inside the trash compactor 158. In these examples, the trash compactor 158 may be actuated to reduce the fill level of waste 116 one or more instances, based on the distance measurements 110 provided by the sensor 108, before a user empties the waste 116.

For example, users may throw away waste (i.e., receipts, candy wrappers, beverage containers, etc.) into a trash can while interacting with an entity (i.e., buying gasoline to fill up a vehicle). In this example, the trash can may be disposed within a trash compactor that is outside near a gas pump. Over time, the fill level of waste in the trash can will increase. To prevent the waste from overflowing and spilling out from the top of the trash can, the trash can may be periodically emptied.

An employee associated with the entity may be too busy performing other tasks to effectively monitor the fill level of the trash can. As the trash can is located within a trash compactor, the trash compactor may be able to reduce the fill level of waste present within the trash can one or more instances before requiring the employee to empty the trash can. The automatic alerting system 100 may be able to actuate the trash compactor to reduce the fill level when the fill level has gotten too high. The automatic alerting system 100 may further notify and prompt the employee that the trash can needs to be emptied when the fill level has gotten too high and the trash compactor is no longer able to compress the waste down to reduce the fill level.

As illustrated in FIG. 1B, the automatic alerting system 100 includes the computer system 102, user device 104, network 106, and sensor 108 as described in FIG. 1A. Computer system 102 is communicatively coupled to user device 104 and sensor 108 via the network 106 using any appropriate wired or wireless telecommunication technology. Computer system 102 receives data in the form of distance measurements 110 that are generated by sensor 108 and in turn provides an alert 112 for display on the user device 104 based on comparing a calculation derived from the distance measurement 110 to a threshold. In general, the computer system 102 may perform an alerting process based on the received distance measurement 110 from sensor 108. In particular embodiments, this process uses the sensor 108 to determine a distance to a trash can 114 in a trash compactor 158 for the computer system 102 to calculate a percentage of waste 116 present within the trash can 114. The percentage of waste 116 may be compared to a threshold value, and the trash compactor 158 may be actuated to reduce the fill level in the trash can 114 when the percentage of waste 116 is greater than the threshold value. Further, the alert 112 may be generated and transmitted to the user device 104 when the percentage of waste 116 is greater than the threshold value and when the trash compactor 158 cannot further reduce the fill level.

For example, the sensor 108 may be disposed in proximity to the trash can 114. In a particular embodiment, the sensor 108 is disposed or mounted within the trash compactor 158 and directed to the trash can 114, wherein the trash can 114 is housed within the trash compactor 158 and waste 116 may be deposited therein through a flap 160. The flap 160 may be disposed near a top portion of the trash compactor 158 operable to rotate into and/or away from the trash compactor 158, thereby allowing a user to insert waste 116 into the trash compactor 158. The waste 116 may fall and lay within the trash can 114 disposed within the trash compactor 158. During operation, a ram 162 coupled to a top of the trash compactor 158 may extend downwards into the trash can 114. The ram 162 may compress any waste 116 present within the trash can 114. A controller 164 communicatively coupled to the trash compactor 158 may be operable to actuate the ram 162 based on operation of the sensor 108. A processor 166 of controller 164 may receive instructions from the computer system 102 or user device 104 when there is a determination that the percentage of waste 116 in the trash can 114 exceeds a threshold value. The processor 166 may then direct a power source to provide power to actuate ram 162 to extend downwards into the trash can 114. During operation, if the waste 116 in the trash can 114 begins to overflow, the flap 160 may prevent one or more additional users from inserting more waste 116 into the trash compactor 158. For example, there may be a locking mechanism operable to temporarily lock the flap 160 in place with an outer surface of the trash compactor 158. The flap 160 may prevent a user from inserting additional waste 116 into the trash compactor 158. The controller 164 may be configured to determine when to lock the flap 160. In examples, the controller 164 may send a signal to lock the flap 160 when the percentage of waste 116 exceeds the threshold.

Figure 2:
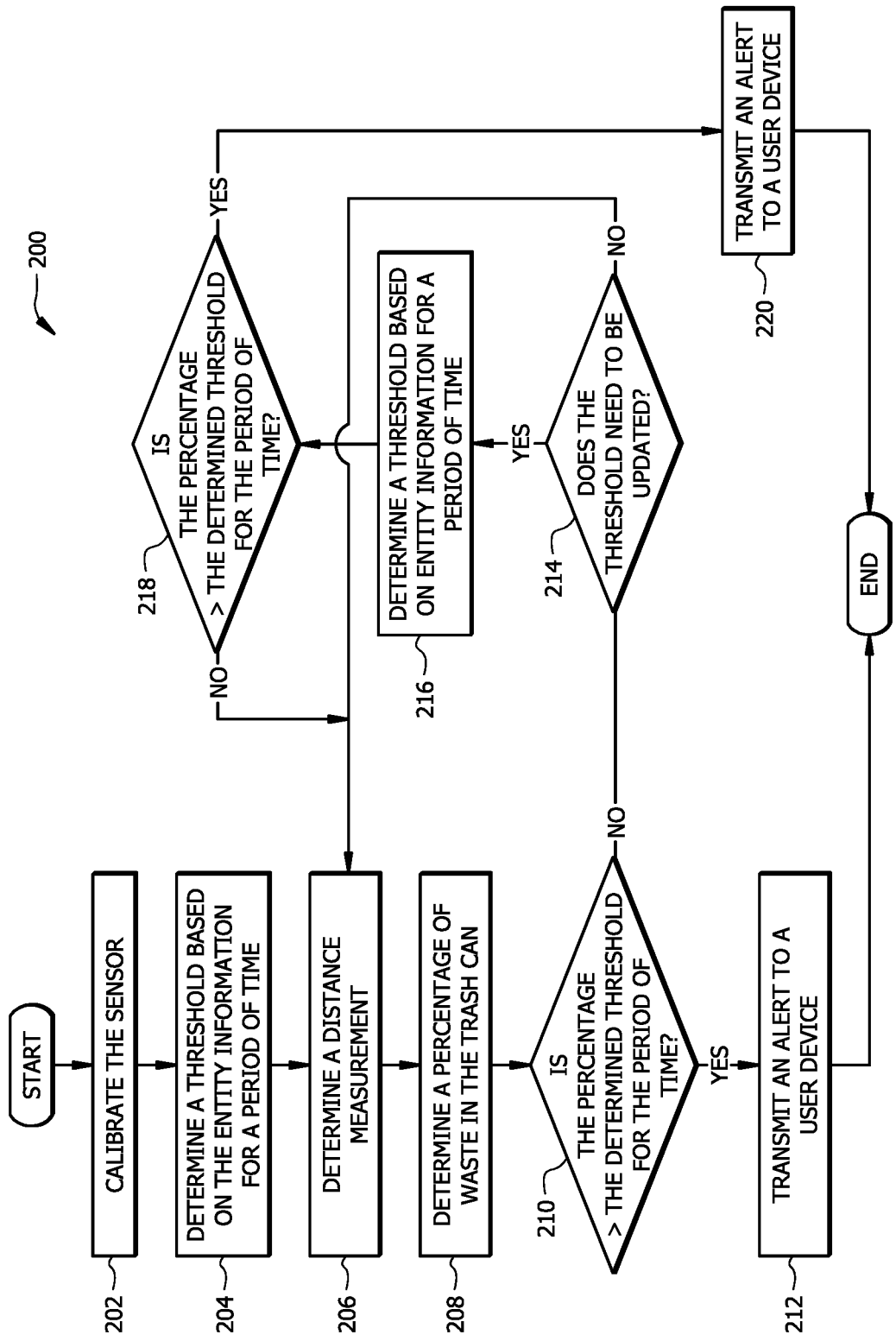
FIG. 2 is a flow diagram illustrating an example operation of the alerting system of FIG. 1A.

Example Operation of the System for Measuring a Fill Level of a Trash Can Using a Sensor FIG. 2 is a flow diagram illustrating an example method 200 of the automatic alerting system 100 of FIG. 1A. In general, method 200 may be utilized by the sensor 108, computer system 102, and user device 104 of FIG. 1A to automatically provide the alert 112 for display on user device 104. The method 200 may begin at operation 202 where the sensor 108 (referring to FIG. 1A) may be calibrated relative to the trash can 114 (referring to FIG. 1A). The sensor 108 may perform a first distance measurement 110a (referring to FIG. 1A) to determine a distance from the bottom end 132 (referring to FIG. 1A) of the trash can 114 to the sensor 108 when the trash can 114 is empty. The sensor 108 may further perform a second distance measurement 110b to determine a distance from the top end 136 (referring to FIG. 1A) of the trash can 114 to the sensor 108, wherein the lid 138 (referring to FIG. 1A) is disposed at the top end 136 of the trash can 114 to reflect the laser beam 130 (referring to FIG. 1A). The sensor 108 may then transmit the first distance measurement 110a and the second distance measurement 110b to the computer system 102 across the network 106 (referring to FIG. 1A). The processor 144 (referring to FIG. 1A) of the computer system 102 may receive the transmitted first distance measurement 110a and the second distance measurement 110b from the network 106 and may instruct the memory 142 (referring to FIG. 1A) to store the first distance measurement 110a and the second distance measurement 110b as the first setpoint 140a (referring to FIG. 1A) and second setpoint 140b (referring to FIG. 1A), respectively.

At operation 204, the processor 144 of the computer system 102 may determine a threshold based, at least in part, on the stored entity information 118 (referring to FIG. 1A) for a period of time. For example, the entity information 118 may comprise data associated with a first entity (i.e., a store) operating at a first location over a plurality of time periods (i.e., every hour, four hours, six hours, etc.). In this particular example, the first entity may process 100 transactions during a first time period and 5 transactions during a second time period. To determine the threshold for the period of time, the processor 144 may identify a high or low volume of transactions within the period of time based on an arbitrary reference value. For example, the processor 144 may determine that there is a high volume of transactions within the time period if the number of transactions is greater than 60 and that there is a low volume of transactions within the time period if the number of transactions is lower than 30. A higher volume of transactions may be associated with a faster rate at which waste 116 (referring to FIG. 1A) is deposited into the trash can 114 over a given period of time. Based, at least in part, on the higher volume of transactions, the frequency at which the trash can 114 requires emptying of waste 116 increases. In the example where the period of time comprises a high volume of transactions, a lower threshold (i.e., 70%) may be designated for use by the computer system 102 for the percentage of waste 116 in the trash can 114. For the above example where the first entity processes 100 transactions during a first time period, a lower threshold may be designated for the first time period. In embodiments wherein there is a lower volume of transactions, a higher threshold (i.e., 90%) may be designated for use by the computer system 102.

At operation 206, the sensor 108 may determine a distance measurement 110. The laser diode 124 (referring to FIG. 1A) of the sensor 108 may produce the laser beam 130 that travels towards the bottom end 132 of the trash can 114, wherein the laser beam 130 is reflected off of the waste 116 to travel back to the sensor 108. The photodetector 126 (referring to FIG. 1A) of the sensor 108 may receive the reflected laser beam 130. The sensor processor 128 (referring to FIG. 1A) of the sensor 108 may determine the distance measurement 110 based on a difference in time between production of the laser beam 130 by the laser diode 124 and reception of the reflected laser beam 130 by the photodetector 126. The sensor processor 128 may further transmit the distance measurement 110 across the network 106.

At operation 208, the processor 144 of the computer system 102 may receive the distance measurement 110 transmitted over the network 106. The processor 144 of the computer system 102 may then calculate a percentage of waste 116 present within the trash can 114 based on the received distance measurement 110. For example, the received distance measurement 110 may comprise a distance value of 35 inches from a level of the waste 116 to the sensor 108, wherein the first setpoint 140a may comprise a distance value of 40 inches from the bottom end 132 of the trash can 114 to the sensor 108. The difference between the first setpoint 140a and the second setpoint 140b may comprise a distance value of 20 inches. The processor 144 may calculate the percentage of waste 116 present within the trash can 114 by dividing the distance value of the difference between the first setpoint 140a and the received distance measurement 110 by the distance value of the difference between the first setpoint 140a and the second setpoint 140b. In this example, the processor 144 may determine the calculated percentage of waste 116 to be 25% (e.g. (40-35)/20).

At operation 210, the processor 144 of the computer system 102 may determine whether the calculated percentage of waste 116 is greater than the determined threshold for the period of time. For example, with reference to the first time period where the first entity processes 100 transactions, the determined threshold may be a lower value (i.e., 70%). The computer system 102 may compare the calculated percentage of waste 116 from operation 208 (for example, previously determined as 25%) to the determined threshold of 70% during the first time period. If there is a determination that the calculated percentage of waste 116 is greater than the determined threshold, the method 200 proceeds to operation 212. Otherwise, the method 200 proceeds to operation 214.

At operation 212, the processor 144 of the computer system 102 may transmit the alert 112 across the network 106 to the user device 104. In this example, the amount of waste 116 in the trash can 114 may be close to the top end 136 (referring to FIG. 1A) of the trash can 114 and continue to be rising. A user associated with the entity managing the trash can 114 may require a notification indicating that the trash can 114 will soon overflow. The alert 112 may indicate that the percentage of waste 116 has surpassed the threshold. Transmission of the alert 112 may signal for an event to occur, such as emptying the waste 116 present within the trash can 114 in order to prevent waste 116 from overflowing out of the trash can 114. After transmission of the alert 112, the method 200 proceeds to end.

At operation 214, the processor 144 of the computer system 102 may determine whether the threshold requires updating, wherein updating comprises determining that the automatic alerting system 100 (referring to FIG. 1A) is operating in a subsequent period of time. For example, the automatic alerting system 100 may be operating within a first period of time (for example, between 8 AM and 12 PM). The automatic alerting system 100 may continue to operate in subsequent periods of time, such as from 12 PM to 4 PM or later. During operation 214, the computer system 102 may determine if the automatic alerting system is still operating within the first period of time (e.g., between 8 AM and 12 PM) or a subsequent period of time (e.g., after 12 PM). If there is a determination that the automatic alerting system 100 is operating in a subsequent period of time, the method 200 proceeds to operation 216. Otherwise, the method 200 proceeds back to operation 206.

At operation 216, the processor 144 of the computer system 102 may determine a threshold based, at least in part, on the stored entity information 118 for the subsequent period of time. For example, as previously described, the first entity may process 100 transactions during the first time period and 5 transactions during the second time period. The computer system 102 may have determined that the threshold for the first time period was a lower threshold, such as 70%. For the second time period, the threshold may be determined to be a higher threshold, such as 90%, because of the lower number of processed transactions during the second time period. Operation 216 may comprise similar process steps as described in operation 204. Depending on the stored entity information 118, the threshold for the subsequent period of time may be equivalent to or different from the threshold for the previous period of time.

At operation 218, the processor 144 of the computer system 102 may determine whether the calculated percentage of waste 116 is greater than the determined threshold for the subsequent period of time. The computer system 102 may be conducting operations and determinations while the automatic alerting system 100 transitions between periods of time (for example, from the first time period to a subsequent time period). The previously calculated percentage of waste 116 may be an arbitrary value that is now greater than or less than the newer determined threshold. For example, the previously calculated percentage of waste 116 may be 80%. In this example, the previously determined threshold may have been a higher threshold, such as 90%, but the threshold determined in operation 216 may be a lower threshold, such as 70%. In operation 218, the previously calculated percentage of waste 116 will be compared to the newer threshold. If there is a determination that the calculated percentage of waste 116 is greater than this determined threshold, the method 200 proceeds to operation 220. Otherwise, the method 200 proceeds back to operation 206.

At operation 220, the processor 144 of the computer system 102 may transmit the alert 112 across the network 106 to the user device 104. In this example, the entity may be transitioning to a busy time period wherein there is an increase in foot traffic and processed transactions. The amount of waste 116 in the trash can 114 may have been close to the top end 136 of the trash can 114 and now exceeds a lower threshold associated with a busy time period. A user associated with the entity managing the trash can 114 may be preemptively notified that the trash can 114 will soon overflow. The alert 112 may indicate that the percentage of waste has surpassed the threshold. Transmission of the alert 112 may signal for an event to occur, such as emptying the waste 116 present within the trash can 114 in order to prevent waste 116 from overflowing out of the trash can 114. After transmission of the alert 112, the method 200 proceeds to end.

Figure 3:
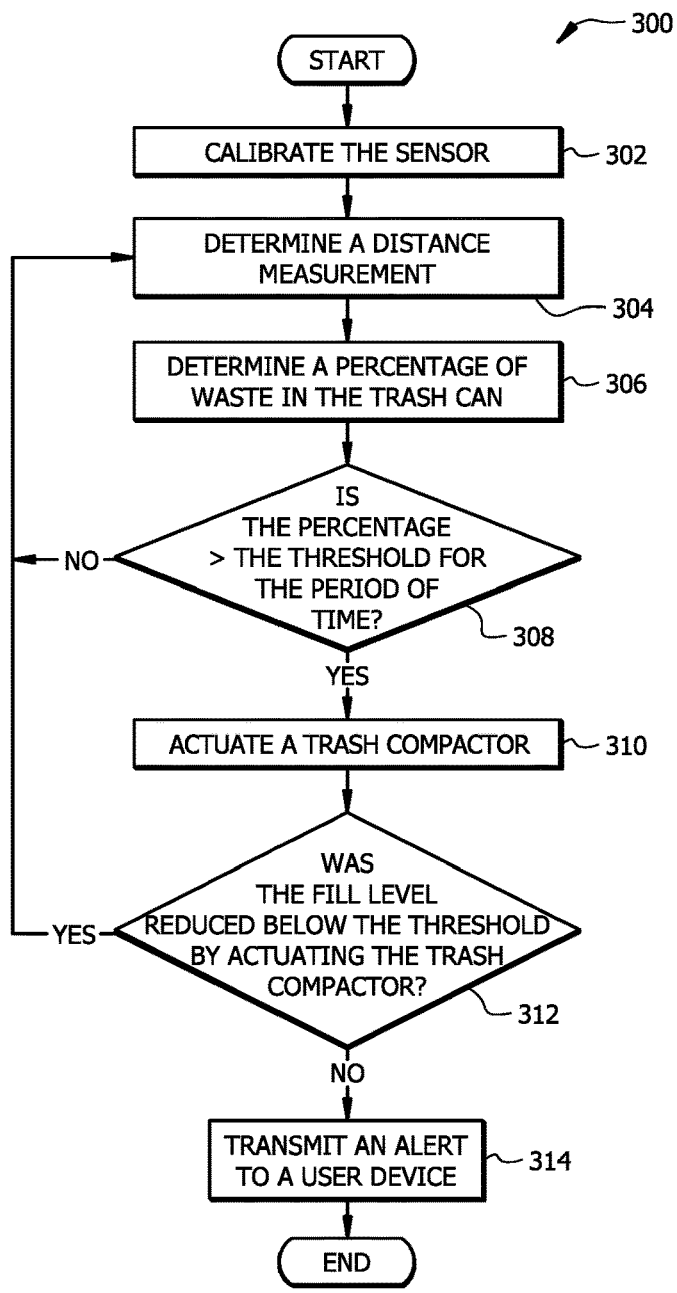
FIG. 3 is a flow diagram illustrating an example operation of the alerting system of FIG. 1B.

Example Operation of the System for Measuring a Fill Level of a Trash Compactor Using a Sensor FIG. 3 is a flow diagram illustrating an example method 300 of the automatic alerting system 100 of FIG. 1B. In general, method 300 may be utilized by the sensor 108, computer system 102, and user device 104 of FIG. 1B to automatically reduce the fill level with the trash compactor 158 (referring to FIG. 1B) and to provide the alert 112 for display on user device 104. The method 300 may begin at operation 302 where the sensor 108 may be calibrated relative to the trash can 114 (referring to FIG. 1B) disposed in the trash compactor 158. The sensor 108 may perform a first distance measurement 110a (referring to FIG. 1B) to determine a distance from the bottom end 132 (referring to FIG. 1B) of the trash can 114 to the sensor 108 when the trash can 114 is empty. The sensor 108 may further perform a second distance measurement 110b to determine a distance from the top end 136 (referring to FIG. 1B) of the trash can 114 to the sensor 108, wherein a structure such as the lid 138 (referring to FIG. 1A) is disposed at the top end 136 of the trash can 114 to reflect the laser beam 130 (referring to FIG. 1B). The sensor 108 may then transmit the first distance measurement 110*a* and the second distance measurement 110*b* to the computer system 102 across the network 106 (referring to FIG. 1B). The processor 144 (referring to FIG. 1B) of the computer system 102 may receive the transmitted first distance measurement 110*a* and the second distance measurement 110*b* from the network 106 and may instruct the memory 142 (referring to FIG. 1B) to store the first distance measurement 110*a* and the second distance measurement 110*b* as the first setpoint 140*a* (referring to FIG. 1A) and second setpoint 140*b* (referring to FIG. 1A), respectively.

At operation 304, the sensor 108 may determine a distance measurement 110. The laser diode 124 (referring to FIG. 1B) of the sensor 108 may produce the laser beam 130 that travels towards the bottom end 132 of the trash can 114, wherein the laser beam 130 is reflected off of the waste 116 to travel back to the sensor 108. The photodetector 126 (referring to FIG. 1B) of the sensor 108 may receive the reflected laser beam 130. The sensor processor 128 (referring to FIG. 1B) of the sensor 108 may determine the distance measurement 110 based on a difference in time between production of the laser beam 130 by the laser diode 124 and reception of the reflected laser beam 130 by the photodetector 126. The sensor processor 128 may further transmit the distance measurement 110 across the network 106.

At operation 306, the processor 144 of the computer system 102 may receive the distance measurement 110 transmitted over the network 106. The processor 144 of the computer system 102 may then calculate a percentage of waste 116 present within the trash can 114 based on the received distance measurement 110. For example, the received distance measurement 110 may comprise a distance value of 35 inches from a level of the waste 116 to the sensor 108, wherein the first setpoint 140*a* may comprise a distance value of 40 inches from the bottom end 132 of the trash can 114 to the sensor 108. The difference between the first setpoint 140*a* and the second setpoint 140*b* may comprise a distance value of 20 inches. The processor 144 may calculate the percentage of waste 116 present within the trash can 114 by dividing the distance value of the difference between the first setpoint 140*a* and the received distance measurement 110 by the distance value of the difference between the first setpoint 140*a* and the second setpoint 140*b*. In this example, the processor 144 may determine the calculated percentage of waste 116 to be 25% (e.g. (40-35)/20).

At operation 308, the processor 144 of the computer system 102 may determine whether the calculated percentage of waste 116 is greater than a threshold for the period of time. For example, with reference to a first time period where the first entity processes 100 transactions, the threshold may be a lower value (i.e., 70%). The computer system 102 may compare the calculated percentage of waste 116 from operation 306 (for example, previously determined as 25%) to the threshold of 70% during the first time period. If there is a determination that the calculated percentage of waste 116 is greater than the threshold, the method 300 proceeds to operation 310. Otherwise, the method 300 proceeds back to operation 304.

At operation 310, the processor 166 (referring to FIG. 1B) of the controller 164 (referring to FIG. 1B) may receive a signal associated with a determination that the calculated percentage of waste 116 is greater than the threshold. The processor 166 may instruct the trash compactor 158 to reduce the fill level of waste 116 in the trash can 114. For example, the ram 162 (referring to FIG. 1B) may be actuated to extend downward to compress any waste 116 disposed in a path of motion of the ram 162. In this example, the calculated percentage of waste 116 may be 72% wherein the threshold may be 70%. After actuating the ram 162, the percentage of waste 116 may be less than the previously calculated percentage of waste 116. The method 300 then proceeds to operation 312.

At operation 312, the processor 144 of the computer system 102 may determine whether the fill level was reduced to below the threshold after actuating the trash compactor 158 from operation 310. For example, as the automatic alerting system 100 continues to operate, waste 116 may build-up within the trash can 114. After the trash compactor 158 operates for one or more instances, the ram 162 may not be able to compress the waste 116 any further. The computer system 102 may determine that a user associated with the entity managing the trash compactor 158 should empty the trash can 114 from the trash compactor 158 if the trash compactor 158 cannot continue in reducing the fill level. If there is a determination that the fill level was reduced to below the threshold after actuating the trash compactor 158, the method 300 proceeds back to operation 304. Otherwise, the method 300 proceeds to operation 314.

At operation 314, the processor 144 of the computer system 102 may generate and transmit the alert 112 across the network 106 to the user device 104. In this example, the trash compactor 158 may no longer be able to reduce the fill level of waste 116 in the trash can 114. The amount of waste 116 in the trash can 114 may now continue to exceed the threshold and build-up. A user associated with the entity managing the trash can 114 may be notified that the trash can 114 in the trash compactor 158 will soon overflow. Transmission of the alert 112 may signal for an event to occur, such as emptying the waste 116 present within the trash can 114 in order to prevent waste 116 from overflowing out of the trash can 114. After transmission of the alert 112, the method 300 proceeds to end.

Example Operation of Calibrating the Sensor

Figure 4:
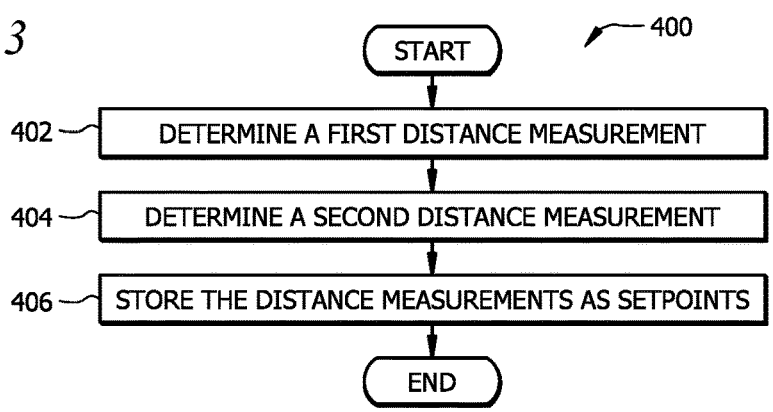
FIG. 4 is a flow diagram illustrating an example operation of calibrating a sensor.

FIG. 4 is a flow diagram illustrating an example method 400 of calibrating the sensor 108 of FIGS. 1A-1B. Method 400 may further describe operation 202 (referring to FIG. 2) of method 200 (referring to FIG. 2) and method 300 (referring to FIG. 3). In general, method 400 may be utilized by the sensor 108, computer system 102, and user device 104 of FIGS. 1A-1B to calibrate the sensor 108 to the trash can 114 (referring to FIG. 1A) and to the trash compactor 158 (referring to FIG. 1B). During operation, the computer system 102 or the user device 104 may instruct the sensor 108 to perform distance measurements 110 (referring to FIGS. 1A-1B). The method 400 may begin at operation 402 where the sensor 108 may perform a first distance measurement 110*a* (referring to FIGS. 1A-1B) to determine a distance D1 from the bottom end 132 (referring to FIGS. 1A-1B) of the trash can 114 or trash compactor 158 to the sensor 108 when the trash can 114 is empty (i.e., when there is no waste 116). The sensor 108 may transmit the first distance measurement 110*a* to the computer system 102 for storage as a setpoint (i.e., the first setpoint 140*a*).

At operation 404, the sensor 108 may perform a second distance measurement 110*b* to determine a distance D2 from the top end 136 (referring to FIGS. 1A-1B) of the trash can 114 to the sensor 108. In embodiments, the lid 138 (referring to FIG. 1A) may be disposed at the top end 136 of the trash can 114 to reflect the laser beam 130 (referring to FIGS. 1A-1B). The sensor 108 may then transmit the second distance measurement 110*b* (referring to FIGS. 1A-1B) to the computer system 102 for storage as a setpoint (i.e., the second setpoint 140*b*).

At operation 406, the processor 144 (referring to FIGS. 1A-1B) of the computer system 102 may receive the transmitted first distance measurement 110a and the second distance measurement 110b from the network 106 and may instruct the memory 142 (referring to FIGS. 1A-1B) to store the first distance measurement 110a and the second distance measurement 110b as the first setpoint 140a (referring to FIGS. 1A-1B) and second setpoint 140b (referring to FIGS. 1A-1B), respectively. In alternate embodiments, processor 156 (referring to FIGS. 1A-1B) of the user device 104 may receive the transmitted first distance measurement 110a and the second distance measurement 110b from the network 106 and may instruct the memory 154 (referring to FIGS. 1A-1B) to store the first distance measurement 110a and the second distance measurement 110b as the first setpoint 140a and second setpoint 140b, respectively. For further operations of the automatic alerting system 100 of FIGS. 1A-1B, a difference between each distance measurement 110 and the first setpoint 140a will be compared to a difference between the first and second setpoints 140a,b to determine a percentage of waste 116 in the trash can 114.

Modifications, additions, or omissions may be made to the methods described herein without departing from the scope of the disclosure. The methods may include more, fewer, or other steps. Additionally, steps may be performed in any suitable order. That is, the steps of any method disclosed herein do not have to be performed in the exact order disclosed, unless explicitly stated.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or." All references to "a/an/the element, apparatus, component, means, step, etc." are to be interpreted openly as referring to at least one instance of the element, apparatus, component, means, step, etc., unless explicitly stated otherwise.

Furthermore, reference to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The embodiments disclosed herein are only examples, and the scope of this disclosure is not limited to them. Particular embodiments may include all, some, or none of the components, elements, features, functions, operations, or steps of the embodiments disclosed herein. Certain embodiments are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

What is claimed is:

1. A system for measuring a fill level of a trash can comprising:
   a sensor disposed above the trash can, the sensor comprising:
      a laser diode operable to produce a laser beam pulse that travels towards a bottom end of the trash can, wherein the laser beam pulse is reflected back to the sensor;
      a photodetector operable to receive the reflected laser beam pulse; and
      a first processor communicatively coupled to the laser diode and to the photodetector, configured to:
         determine a distance measurement based on a difference in time between production of the laser beam pulse and reception of the reflected laser beam pulse; and
         transmit the distance measurement across a network; and
   a computer system communicatively coupled to the sensor, comprising:
      a memory operable to:
         store entity information comprising of a number of transactions associated with a plurality of users present within an entity based on periods of time; and
         store a first setpoint and a second setpoint for determining a threshold; and
      a second processor operably coupled to the memory, configured to:
         receive the distance measurement from the network;
         calculate a percentage of waste in the trash can based on the received distance measurement and a difference between the first setpoint and the second setpoint;
         determine the threshold for a first period of time based on the entity information stored in the memory;
         compare the percentage of waste in the trash can to the threshold for the first period of time; and
         send an alert for display on a user device when the percentage of waste is greater than the threshold for the first period of time.

2. The system of claim 1, wherein the first processor is further configured to:
   perform a first distance measurement to determine a distance from the bottom end of the trash can to the sensor when the trash can is empty;
   transmit the first distance measurement to the computer system for storage as the first setpoint;
   perform a second distance measurement to determine a distance from a top end of the trash can to the sensor, wherein a lid is disposed at the top end of the trash can operable to reflect the laser beam pulse; and
   transmit the second distance measurement to the computer system for storage as the second setpoint.

3. The system of claim 1, wherein:
the first processor is further configured to transmit the distance measurement to the computer system.

4. The system of claim 1, wherein the second processor is further configured to:
in response to comparing the percentage of waste in the trash can to the threshold for the first period of time, determine that the percentage of waste is less than the threshold for the first period of time.

5. The system of claim 4, wherein the second processor is further configured to:
determine that the threshold for the first period of time requires updating, wherein updating comprises determining that the system is operating in a subsequent period of time; and
determine a threshold for the subsequent period of time based on the entity information stored in the memory.

6. The system of claim 5, wherein the second processor is further configured to:
compare the percentage of waste in the trash can to the threshold for the subsequent period of time; and
send an alert for display on the user device when the percentage of waste is greater than the threshold for the subsequent period of time.

7. The system of claim 6, wherein the second processor is further configured to:
in response to comparing the percentage of waste in the trash can to the threshold for the subsequent period of time, determine that the percentage of waste is less than the threshold for the subsequent period of time;
receive a subsequent distance measurement from the network;
calculate a subsequent percentage of waste in the trash can; and
compare the subsequent percentage of waste in the trash can to the threshold for the subsequent period of time.

8. The system of claim 1, wherein:
the sensor is further configured to transmit the distance measurement to the computer system.

9. A method for measuring a fill level of a trash can, comprising:
receiving a distance measurement from a sensor across a network;
calculating a percentage of waste in the trash can based on the received distance measurement and a difference between a first setpoint and a second setpoint;
determining a threshold for a first period of time based on entity information;
comparing the percentage of waste in the trash can to the threshold for the first period of time; and
sending an alert for display on a user device in response to the percentage of waste being greater than the threshold for the first period of time.

10. The method of claim 9, further comprising:
receiving a first distance measurement associated with a distance from a bottom end of the trash can to the sensor when the trash can is empty for storage as a first setpoint; and
receiving a second distance measurement associated with a distance from a top end of the trash can to the sensor, wherein a lid is disposed at the top end of the trash can operable to reflect a laser beam produced by the sensor.

11. The method of claim 9, further comprising:
in response to comparing the percentage of waste in the trash can to the threshold for the first period of time, determining that the percentage of waste is less than the threshold for the first period of time.

12. The method of claim 11, further comprising:
determining that the threshold for the first period of time requires updating, wherein updating comprises determining that an alerting system is operating in a subsequent period of time; and
determining a threshold for the subsequent period of time based on the entity information.

13. The method of claim 12, further comprising:
comparing the percentage of waste in the trash can to the threshold for the subsequent period of time; and
sending an alert for display on the user device in response to the percentage of waste being greater than the threshold for the subsequent period of time.

14. The method of claim 13, further comprising:
in response to comparing the percentage of waste in the trash can to the threshold for the subsequent period of time, determining that the percentage of waste is less than the threshold for the subsequent period of time;
receiving a subsequent distance measurement from the network;
calculating a subsequent percentage of waste in the trash can; and
comparing the subsequent percentage of waste in the trash can to the threshold for the subsequent period of time.

15. The method of claim 9, wherein the sensor is configured to transmit the distance measurement using an internet communications protocol.

16. A system for measuring a fill level of a trash can comprising:
a sensor disposed within a trash compactor and above the trash can, the sensor configured to:
determine a distance measurement based on a difference in time between production of a laser beam pulse and reception of a reflected laser beam pulse; and
transmit the distance measurement across a network; and
a computer system communicatively coupled to the sensor, comprising:
a memory operable to:
store a first setpoint and a second setpoint for determining a threshold; and
a first processor operably coupled to the memory, configured to:
receive the distance measurement from the network;
calculate a percentage of waste in the trash can based on the received distance measurement and a difference between the first setpoint and the second setpoint;
compare the percentage of waste in the trash can to a threshold for a period of time;
instruct the trash compactor to reduce the fill level of waste by actuating a ram to extend downwards into the trash can to compress the waste in response a determination that the percentage of waste in the trash can is greater than the threshold for the period of time; and
send an alert for display on a user device when the percentage of waste is greater than the threshold for the period of time and in response to a determination that the fill level was not reduced below the threshold by actuating the trash compactor.

17. The system of claim 16, wherein the sensor is further configured to:
perform a first distance measurement to determine a distance from the bottom end of the trash can to the sensor when the trash can is empty;

transmit the first distance measurement to the computer system for storage as the first setpoint;

perform a second distance measurement to determine a distance from a top end of the trash can to the sensor; and transmit the second distance measurement to the computer system for storage as the second setpoint.

18. The system of claim 16, further comprising a controller communicatively coupled to the trash compactor, comprising:

a second processor configured to:

receive the determination that the percentage of waste in the trash can is greater than the threshold for the period of time; and actuate the ram to extend downwards into the trash can.

19. The system of claim 16, wherein the first processor is further configured to:

receive a subsequent distance measurement from the network in response to a determination that the percentage of waste is less than the threshold;

calculate a subsequent percentage of waste in the trash can; and compare the subsequent percentage of waste in the trash can to the threshold.

20. The system of claim 19, wherein the first processor is further configured to:

determine that the subsequent percentage of waste in the trash can is greater than the threshold for the period of time;

instruct the trash compactor to reduce the fill level of waste by actuating a ram to extend downwards into the trash can to compress the waste; and send an alert for display on the user device when the percentage of waste is greater than the threshold for the period of time and in response to a determination that the fill level was not reduced below the threshold by actuating the trash compactor.

* * * * *